(12) United States Patent
Durairaj et al.

(10) Patent No.: US 12,086,813 B1
(45) Date of Patent: Sep. 10, 2024

(54) SMART GLASSES SYSTEMS AND METHODS FOR PROPERTY ASSESSMENT

(71) Applicant: United Services Automobile Association (USAA), San Antonio, TX (US)

(72) Inventors: Ravi Durairaj, San Antonio, TX (US); Mark Paxman Warnick, San Antonio, TX (US); Will Kerns Maney, San Antonio, TX (US); Elena Marie Carrasco, Converse, TX (US); Nolan Serrao, Plano, TX (US); Jeanie Graciela Lopez, San Antonio, TX (US); Nathan Lee Post, Rockport, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 185 days.

(21) Appl. No.: 17/489,285

(22) Filed: Sep. 29, 2021

(51) Int. Cl.
| | |
|---|---|
| *G06Q 30/00* | (2023.01) |
| *G02B 27/01* | (2006.01) |
| *G06Q 30/016* | (2023.01) |
| *G06Q 30/0283* | (2023.01) |
| *G06Q 50/16* | (2024.01) |

(52) U.S. Cl.
CPC ....... *G06Q 30/016* (2013.01); *G02B 27/0172* (2013.01); *G06Q 30/0283* (2013.01); *G06Q 50/16* (2013.01); *G02B 2027/0138* (2013.01); *G02B 2027/014* (2013.01); *G02B 2027/0178* (2013.01)

(58) Field of Classification Search
None
See application file for complete search history.

(56) References Cited

U.S. PATENT DOCUMENTS

| | | | | |
|---|---|---|---|---|
| 2002/0069101 A1* | 6/2002 | Vincent | ............. | G06Q 30/0255 707/999.01 |
| 2010/0302594 A1* | 12/2010 | Chapman | ................ | G06T 11/60 358/1.18 |
| 2014/0047320 A1* | 2/2014 | Le Chevalier | ........ | G06F 40/131 715/234 |
| 2016/0036953 A1* | 2/2016 | Lee | .......................... | H04M 1/05 455/426.1 |
| 2016/0129638 A1* | 5/2016 | Bostick | .................... | G06F 30/00 700/98 |
| 2016/0300316 A1* | 10/2016 | Beseda | ................ | G06Q 30/012 |
| 2017/0221110 A1* | 8/2017 | Sullivan | ................ | G06Q 10/20 |
| 2021/0042843 A1* | 2/2021 | Bryant | ................... | G08B 21/20 |

(Continued)

*Primary Examiner* — Matthew T Sittner
(74) *Attorney, Agent, or Firm* — Fletcher Yoder P.C.

(57) ABSTRACT

A smart glasses system includes smart glasses configured to be worn by an individual. The smart glasses include a display and a camera configured to obtain one or more images. One or more processors are communicatively coupled to the smart glasses and are configured to receive the one or more images and to process the one or more images to identify characteristics of damage to a property. The one or more processors are also configured to generate, based on the characteristics of the damage to the property, a mitigation protocol. The one or more processors are further configured to provide an output indicative of one or more steps of the mitigation protocol to the smart glasses for presentation to the individual via the display.

19 Claims, 5 Drawing Sheets

(56) References Cited

U.S. PATENT DOCUMENTS

| | | | |
|---|---|---|---|
| 2021/0271081 A1* | 9/2021 | Yun | H04N 13/344 |
| 2021/0287002 A1* | 9/2021 | Mohapatra | G06V 20/20 |
| 2021/0301985 A1* | 9/2021 | Brown | G05B 23/0221 |
| 2021/0350038 A1* | 11/2021 | Jenson | G06V 20/653 |
| 2022/0253946 A1* | 8/2022 | Kenney | G06Q 40/08 |
| 2023/0095173 A1* | 3/2023 | Khosravan | G06T 5/73 |

* cited by examiner

SMART GLASSES SYSTEMS AND METHODS FOR PROPERTY ASSESSMENT

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Damage to a property may occur due to natural disasters (e.g., freezing temperatures, hurricanes), accidents (e.g., electrical fire), wear over time (e.g., stretched fluid hoses), or for any of a variety of other reasons. Detection and/or assessment of the damage is generally performed through an in-person, physical inspection of the property. For example, an insurance adjuster may visit the property to inspect damage caused by a leak from an appliance (e.g., dishwasher or washing machine) in order to assess the damage and to estimate a cost to repair the damage. Similarly, a technician may visit the property to inspect a failure (e.g., to turn on or operate as expected) of an appliance in order to assess the failure and to estimate a cost to repair the appliance.

SUMMARY

Certain embodiments commensurate in scope with the present disclosure are summarized below. These embodiments are not intended to limit the scope of the disclosure, but rather these embodiments are intended only to provide a brief summary of possible forms of present embodiments. Indeed, present embodiments may encompass a variety of forms that may be similar to or different from the embodiments set forth below.

In one embodiment, a smart glasses system includes smart glasses configured to be worn by an individual. The smart glasses include a display and a camera configured to obtain one or more images. One or more processors are communicatively coupled to the smart glasses and are configured to receive the one or more images and to process the one or more images to identify characteristics of damage to a property. The one or more processors are also configured to generate, based on the characteristics of the damage to the property, a mitigation protocol. The one or more processors are further configured to provide an output indicative of one or more steps of the mitigation protocol to the smart glasses for presentation to the individual via the display.

In one embodiment, a smart glasses system includes smart glasses that are configured to be worn by an individual at a property and that include a camera. The smart glasses system includes a workstation configured to be operated by a customer service representative, wherein the workstation is located remotely from the property and comprises a workstation display. The smart glasses system includes one or more processors communicatively coupled to the smart glasses and to the workstation. The one or more processors are configured to receive one or more images from the camera, wherein the one or more images indicate damage to the property. The one or more processors are also configured to receive property data related to the property. The one or more processors are further configured to provide an output to the workstation, wherein the output comprises the one or more images and an indication of the property data for presentation to the customer service representative via the workstation display.

In one embodiment, a method of operating a smart glasses system includes receiving, at one or more processors, one or more images captured by a camera of smart glasses located at a property. The method also includes receiving, at the one or more processors, additional inputs related to damage at the property. The method also includes processing, using the one or more processors, the one or more images, the additional inputs, or both to generate a mitigation protocol to address the damage to the property. The method further includes outputting, using the one or more processors, an indication of one or more steps of the mitigation protocol to the smart glasses for presentation to an individual via a display of the smart glasses.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

When an individual (e.g., user; owner) identifies damage to a property (e.g., a structure of a building, such as a residential building; items within a building, such as an appliance within the building), the individual may want to quickly and properly mitigate the damage. The individual may also want to obtain an estimate from an insurance provider and/or another entity (e.g., repair company) to repair the damage. However, in some cases, the individual may not be aware of steps to take to quickly and properly mitigate the damage. Additionally, an inspector (e.g., insurance adjuster; technician) may not be immediately available to conduct an in-person, physical inspection of the property and/or there may be a high cost associated with such in-person, physical inspection of the property.

Furthermore, it is presently recognized that smart glasses may become readily available and used frequently due to their convenience and portability. Indeed, smart glasses may become a preferred smart device for many individuals, such that the individuals choose to carry and use smart glasses to complete tasks instead of carrying and using mobile phones, tablets, cameras, or combinations thereof. Advantageously, smart glasses may be outfitted with numerous components to gather data, process data, communicate data, and/or output information to provide various types of advanced functionality in a small, wearable form.

Accordingly, it is also presently recognized that it may be beneficial to provide a smart glasses system that includes smart glasses to facilitate assessment of the damage to the property. In particular, the smart glasses may be worn by the individual, and the smart glasses may include a camera that is configured to capture images, a microphone that is configured to detect sounds, a speaker that is configured to output sounds, and/or a display (e.g., transparent display) that is configured to display information. The smart glasses may include a communication component that is configured to connect to a network (e.g., the Internet, WiFi, Bluetooth, 5G). Thus, the smart glasses may facilitate communication between the individual wearing the smart glasses and a customer service representative (CSR) at a remote location, as well as transfer of the images from the camera of the smart glasses to a workstation of the CSR (e.g., in real-time and during the communication between the individual and the customer service representative). The images from the camera of the smart glasses may enable the CSR to effectively assist the individual, such as by allowing the CSR to view the damage to the property as the CSR guides the individual through appropriate steps to quickly and properly mitigate the damage to the property.

In some embodiments, the smart glasses system includes a computing system (e.g., central computing system) that connects to the smart glasses and to the workstation of the CSR via the network. The computing system may be configured to receive various inputs, such as the images from the camera of the smart glasses, sound inputs from the smart glasses, verbal or keyed inputs from the workstation of the CSR, prior data, or the like. The computing system may analyze the inputs to detect any of a variety of characteristics of the damage, such as a type of the damage, a severity of the damage, a source of the damage, and/or a location of the damage. The computing system may be configured to use the characteristics of the damage to generate a mitigation protocol (e.g., one or more steps to address the damage; a recommendation), which may be presented via a display of the workstation of the CSR and/or via the display of the smart glasses. The computing system may also be configured to calculate a cost to repair the damage, which may include a cost to replace parts.

In some embodiments, the damage to the property may include damage to an appliance (e.g., failure of the appliance). For example, the damage to the property may be damage to a dishwasher, and the computing system may be configured to generate a mitigation protocol and/or calculate a cost to repair the dishwasher. In some embodiments, the damage to the property may include primary damage to (e.g., failure of) an appliance that causes secondary damage to a structure of the property. For example, the primary damage may be a burst water hose of a dishwasher that causes the secondary damage of pooling water and warping at flooring of the property. In such cases, the computing system may be configured to generate a mitigation protocol and/or calculate a cost to repair the primary damage and/or the secondary damage (e.g., the dishwasher and/or the flooring of the property).

The smart glasses system may be configured to carry out additional and/or alternative techniques to facilitate effective, efficient assessment of damage to the property. For example, the smart glasses system may include or coordinate with one or more sensors that are configured to detect damage conditions at the property (e.g., leaks, pools of water, abnormal sounds that indicate failure of an appliance), and sensor data from the one or more sensors may trigger an alert to the individual to utilize the smart glasses for assessment of damage to the property. As another example, the computing system may be configured to carry out an automated exchange with the individual via the smart glasses without involving or connecting to the workstation of the CSR. In this way, the computing system may analyze the inputs to generate the mitigation protocol and may instruct display of the mitigation protocol to the individual via the smart glasses.

Furthermore, the smart glasses system may be integrated with and/or coordinated with an insurance system. Thus, the computing system (or some other computing system) may adjust an insurance cost (e.g., premium and/or deductible) for an insurance policy associated with the individual and/or the property based on activation of the smart glasses system and/or features of the smart glasses system as it is implemented at the property. For example, a discount may be applied to the insurance cost for a property insurance policy for the property in response to the individual registering the smart glasses with the computing system (e.g., associating the smart glasses with the property), setting up the smart glasses to link to the computing system (e.g., by downloading an application on the smart glasses), and/or inputting information about the property that would facilitate assessment of the damage to the property via the smart glasses system (e.g., a make, model, and year of an appliance; a floorplan). As another example, a discount may be applied to the insurance cost for the property insurance policy for the property in response to the individual proceeding with a recommended repair and/or replacement. Indeed, the smart glasses system may output various recommendations, including recommendations to carry out preventive inspections, preventive maintenance, repairs, and/or replacements, and then the discount may be applied to the insurance cost for the property insurance policy for the property in response to completion of tasks noted in the recommendations.

Figure 1:
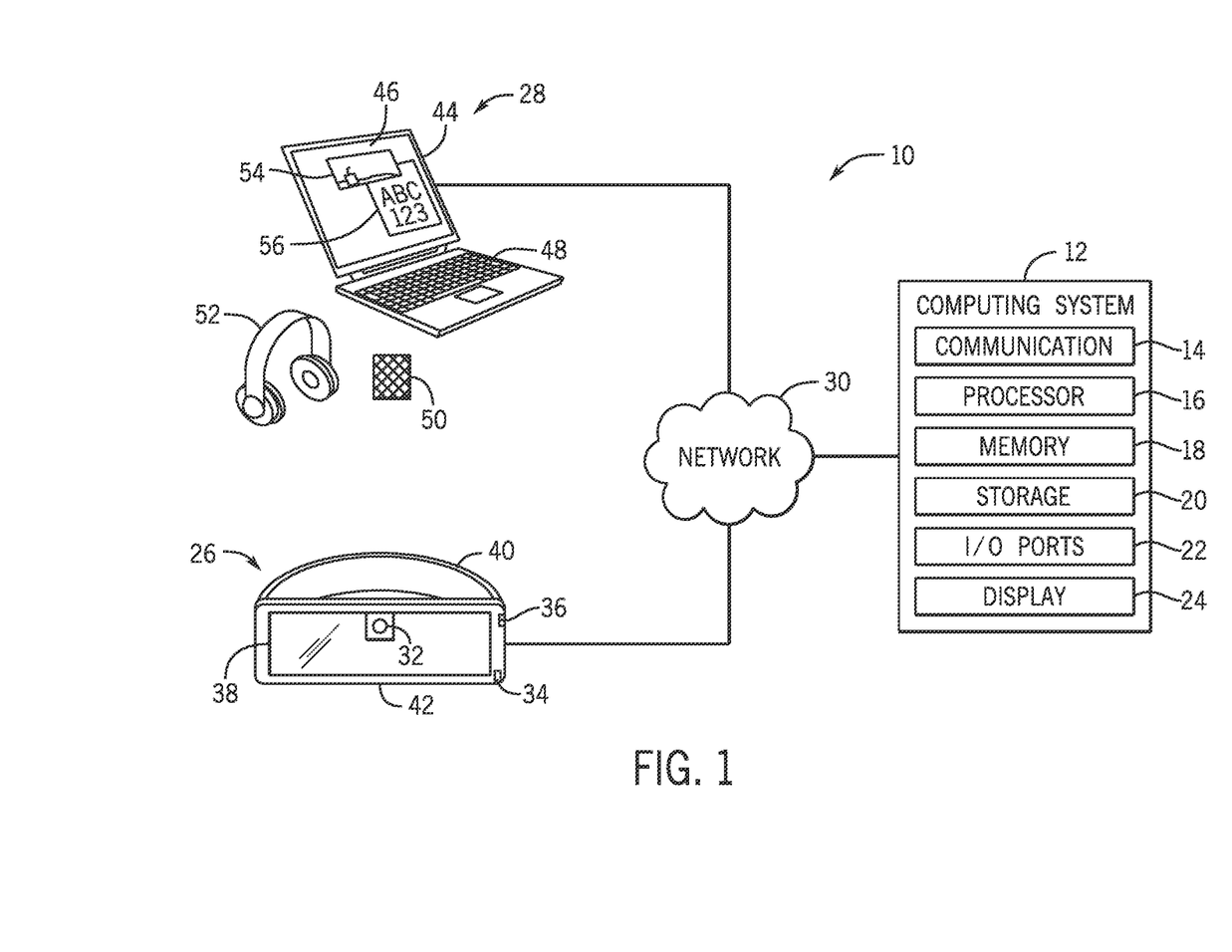
FIG. 1 illustrates a schematic diagram of a smart glasses system that is configured to facilitate assessment of a property, in accordance with embodiments described herein.

With the foregoing in mind, FIG. 1 is a schematic diagram of a smart glasses system 10 that is configured to facilitate assessment of a property (e.g., a structure of a building, such as a residential building; items within a building, such as an appliance within the building). As shown, the smart glasses system 10 includes a computing system 12 (e.g., central computing system) that includes a communication component 14, a processor 16, a memory device 18, a storage device 20, input/output (I/O) ports 22, and a display 24. The computing system 12 may utilize the communication component 14 to communicate with smart glasses 26 (e.g., smart glasses device) and/or a workstation 28 via a network 30.

The smart glasses 26 may be worn by an individual (e.g., owner) at the property, and the workstation 28 may be operated by a customer service representative (CSR) at a remote location (e.g., remote from the property). The smart glasses 26 may include a camera 32 that is configured to capture images of an environment, a microphone 34 that is configured to detect sounds, a speaker 36 that is configured to output sounds, and/or a display 38 (e.g., transparent display; display screen; surface) that is configured to display information for visualization by the individual while the individual wears the smart glasses 26 (e.g., on their head with the display 38 positioned in from of their eyes). The smart glasses 26 may include a strap 40 (e.g., band) or other structure (e.g., arms that rest on ears of the individual) to secure a frame 42 of the smart glasses 26, as well as the various components supported on the frame 42, to the head of the individual. The smart glasses 26 may also include an electronic controller, which may include a processor and a memory device, as well as a communication component to facilitate communication via the network 30. The smart glasses 26 may also include a power source, such as a rechargeable battery, to power the various other components of the smart glasses 26.

The workstation 28 may include a computer 44 (e.g., laptop computer) that may include a display 46 to display information to the CSR, an input device 48 (e.g., keyboard and/or mouse) to detect touch inputs and to enable the CSR to provide touch or keyed inputs, a microphone 50 to detect sounds and to enable the CSR to provide verbal inputs, and/or a speaker 52 to output sounds. The microphone 34 and the speaker 36 of the smart glasses 26 and the microphone 50 and the speaker 52 of the workstation 28 may enable the individual and the CSR to communicate (e.g., have a spoken conversation) with one another. The workstation 28 may also include a processor and a memory device, as well as a communication component to facilitate communication via the network 30. The workstation 28 may also include a power source, such as a rechargeable battery, to power the various other components of the workstation 28.

In operation, the individual may observe damage at the property. For example, the individual may observe water flooding a room at the property. In some cases, the individual may not know the appropriate steps to take to quickly and properly stop the flooding and to mitigate damage caused by the flooding. In some cases, the individual may know some of all of the appropriate steps, but may want support from the CSR and/or may want to expedite the repair process. Thus, regardless of whether the individual is aware of the appropriate steps, the individual may find it helpful to wear the smart glasses 26 upon detection of the flooding or other damage at the property. Use of the smart glasses 26 upon detection of the flooding or other damage at the property may also enable an insurance provider and/or a repair company to conduct a remote inspection of the property, thereby saving substantial time and eliminating certain costs that might be incurred with in-person, physical inspections of the property.

The individual may turn on the smart glasses 26 and initiate a request for assistance with respect to the damage at the property. For example, the individual may open an application via the smart glasses 26 or otherwise request connection to the computing system 12, such as by providing a verbal input (e.g., voice command) via the microphone 34. In some cases, the individual may request connection to one of the CSRs, which may result in connection to both the workstation 28 and the computing system 12.

The individual may use the smart glasses 26 and the CSR may use the workstation 28 to communicate with one another. For example, the microphone 34 and the speaker 36 of the smart glasses 26 and the microphone 50 and the speaker 52 of the workstation 28 may enable the individual and the CSR to have a spoken conversation, much like a telephone call or a video conference call. Additionally, while the smart glasses 26 are on and/or in response to the request for assistance, the camera 32 of the smart glasses 26 may begin to capture images (e.g., still and/or moving images) of an environment in front of and/or in a vicinity of the smart glasses 26. While the smart glasses 26 are on and/or in response to the request for assistance, the display 38 of the smart glasses 26 may display relevant information to the individual, such as confirmation that connection between the smart glasses 26 and the computing system 12 has been established, a name of the CSR assigned to communicate with the individual via the smart glasses system 10, an automated message with initial guidance to use the camera 32 of the smart glasses 26 to obtain images of the damage, or the like.

In some cases, the CSR may rely on their own experience and knowledge to assist the individual to stop the leak and to mitigate the damage at the property (e.g., without guidance and/or analysis from the computing system 12). Indeed, the computing system 12 may be absent or may merely facilitate transfer of data between the smart glasses 26 and the workstation 28 of the CSR. The CSR may be able to effectively assist the individual because the CSR may view the images on the display 46 of the computer 44 at the workstation 28 in real-time (e.g., in substantially real-time), and the individual may have their hands free because they are able to obtain the images with the camera 32 of the smart glasses 26 and to communicate via the microphone 34 and the speaker 36 of the smart glasses 26. Then, the CSR can request that the individual complete certain steps, such as to shut off a valve, divert the water from another appliance that may be sensitive to water intrusion, unplug the appliance, or the like. As shown in FIG. 1, a displayed image 54 on the display 46 of the computer 44 at the workstation 28 includes the image of the water flooding and pooling on the floor of the room at the property.

In some cases, the CSR may utilize and benefit from the analytical capabilities of the computing system 12. For example, the computing system 12 may receive various inputs, such as the images from the camera 32 of the smart glasses 26, verbal inputs and/or other sound inputs from the microphone 34 of the smart glasses 26, verbal inputs and/or other sound inputs from the microphone 50 of the workstation 28, and/or keyed inputs from the input device 48 of the workstation 28. The computing system 12 may receive or access other inputs, such as relevant property information (e.g., data) for the property (e.g., a make, model, and year of an appliance at the property; a floorplan of the property; a location of a shut-off valve at the property; an address of the property; an owner of the property) from one or more databases, sensor data (e.g., water fingerprinting data to indicate a source of a leak) from one or more sensors at the property, or the like.

In some embodiments, at least some of the relevant property information may be input by the individual during a registration process (e.g., at initial setup) prior to the damage. In some embodiments, at least some of the relevant property information may be conveyed via the images, the sound inputs, the verbal inputs, and/or the keyed inputs. For example, a floorplan of the property may be submitted by the individual scanning an architectural blueprint of the property during the registration process, while a make, model, and year of an appliance at the property may be provided via the keyed inputs based on the conversation between the individual and the CSR. As another example, a location of a shut-off valve at the property may be accessed from a utility database and/or a construction database, while the make, model, and year of the appliance at the property may be determined based on image analysis of the images captured by the camera 32 of the smart glasses 26 during a current communication to address the damage at the property. In order to access the relevant property information, the computing system 12 may receive an identifier (e.g., unique identifier) from the smart glasses 26. The identifier may be linked to the property (e.g., during a registration process) and associated with the property information in the one or more databases, and thus, the computing system 12 may utilize the identifier to access the relevant property information. However, the computing system 12 may additionally or alternatively access or receive the relevant property information via the verbal and/or the keyed inputs, or in any other suitable manner. The computing system 12 may output the relevant property information for display to the CSR and/or the individual. For example, the computing system 12 may output characteristics (e.g., make, model, and year) of an appliance at the property over or adjacent to the displayed image 54 on the display 46 of the computer 44 at the workstation 28.

In any case, the computing system 12 may process the inputs to generate a mitigation protocol, which may include one or more steps to address the damage at the property. As one non-limiting example, the individual may communicate to the CSR that there is a leak at a dishwasher in their home. The CSR may input these details via an application on the computer 44, and the computing system 12 may then provide prompts to the CSR to guide the CSR to obtain more information. As shown in FIG. 1, a displayed guide 56 on the display 46 of the computer 44 at the workstation 28 includes prompts to request more information and/or other text for visualization by the CSR. In some cases, the prompts may guide the CSR to ask for a make, model, and year of the appliance. In some cases, the computing system 12 may guide the CSR to ask for a start time of the leak, additional images taken from certain locations or perspectives, or the like. The CSR may then listen to responses provided by the individual, may view the images on the display 46 of the computer 44, and/or may input the additional details via the application on the computer 44.

It should be appreciated that some of all of these steps to gather data and/or provide inputs to the computing system 12 may be automated. As noted herein, the make, model, and year of the appliance may be derived by the computing system 12 via image analysis of the images captured by the camera 32 of the smart glasses 26. For example, the computing system 12 may carry out a template matching analysis to match a shape of the appliance to a library of appliances in a database and/or text recognition to read model numbers in the images. Similarly, the make, model, and year of the appliance, the existence of the leak, the location of the leak, the type of the appliance, and/or the start time of the leak may be derived by the computing system 12 based on sensor data, speech recognition algorithms for analysis of verbal inputs from the microphone 34 of the smart glasses 26 and/or the microphone 50 of the workstation 28, sound analysis to categorize other sounds (e.g., faulty appliances or gushing water) detected by the microphone 34 of the smart glasses 26, and/or image analysis of the images captured by the camera 32 of the smart glasses 26.

In any case, the computing system 12 may collect and analyze the various inputs to generate the mitigation protocol that is appropriate for the circumstances. For example, the computing system 12 may generate a first mitigation protocol to address a leak from a first make and model dishwasher and may generate a second, different mitigation protocol to address a leak from a second, different make and model dishwasher. Indeed, the computing system 12 may generate multiple different mitigation protocols based on the various inputs, such as via machine learning algorithms.

Furthermore, the computing system 12 may update and generate the mitigation protocol during a current communication or assessment. For example, the computing system 12 may generate the mitigation protocol with a first step to shut off a valve. Then, the computing system 12 may assess the response via analysis of keyed inputs, analysis of verbal inputs, image analysis of images captured by the camera 32, and/or via sound analysis of sounds detected by the microphone 34 to determine whether the first step to shut off the valve is successful. If the analysis indicates that the leak (e.g., active leak) has stopped, then the computing system 12 may determine that an appropriate next step in the mitigation protocol is for the individual to move around the dishwasher to capture additional images from additional perspectives. However, if the analysis indicates that the leak (e.g., active leak) has not stopped, then the computing system 12 may determine that an appropriate next step in the mitigation protocol is for the individual to access another shut off valve for the entire property. In this way, the computing system 12 may adapt to the circumstances and success (or lack of success) of the mitigation protocol in real-time (e.g., substantially real-time) during the current communication with the individual. Additionally, the individual and/or the CSR may provide feedback regarding the mitigation protocol, and the computing system 12 may update the mitigation protocol based on the feedback. For example, the individual and/or the CSR may provide verbal and/or keyed inputs to skip a step in the mitigation protocol generated by the computing system 12, such as by saying "NEXT" and/or tapping a "NEXT" virtual button presented in the displayed guide 56 on the display 46 of the computer 44 of the workstation 28.

It should be appreciated that the image analysis and the sound analysis may be carried out in any of a variety of manners. For example, the camera 32 may capture moving images, and the computing system 12 may isolate still images from the moving images. The computing system 12 may compare a first still image from a first time to a second still image from a second time to identify changes (e.g., whether a pool of water is getting deeper), or the computing system 12 may identify a portion of a still image that matches an expected pattern (e.g., for spraying or gushing water) to determine whether the leak has stopped or is ongoing. Additionally, the microphone 34 may detect sounds in the environment, and the computing system 12 may compare the sounds to sound signatures stored in a library in a database. The sound signatures may be correlated to certain types of events or conditions, such as a first sound signature that corresponds to gushing water, a second sound signature that corresponds to water spraying from a burst flexible hose, a third sound signature that corresponds to a washing machine being out of balance, and so on. In this way, the computing system 12 may determine the conditions at the property based on the sounds detected by the microphone 34 and/or by any other suitable sound sensor at the property that is communicatively connected to the computing system 12.

As noted herein, the computing system 12 may output the steps of the mitigation protocol to the computer 44 for display to the CSR, which may effectively guide the CSR and enable the CSR to describe the steps to the individual. For example, the computing system 12 may output a step of "First, shut off a valve located in the cabinet under the sink next to the dishwasher" to the computer 44 for display to the CSR. Then, the CSR may describe the first step to the individual and answer questions that the individual might have as they attempt to carry out the first step. Notably, to generate this first step and/or other steps, the computing system 12 may rely on information that is not provided via keyed inputs during the current communication between the individual and the CSR. In some cases, to generate this first step and/or other steps, the computing system 12 may rely on information that is not provided via verbal inputs during the current communication between the individual and the CSR. Instead, to generate this first step and/or other steps, the computing system 12 may rely on information derived from the images obtained by the camera 32 of the smart glasses 26, sound inputs obtained via the microphone 34 of the smart glasses 26 and/or other sound sensors at the property, and/or prior data input during a registration process.

With reference to the present example, to generate the first step to shut off the valve, the computing system 12 may determine the location of the valve based on the floorplan that was input during the registration process and/or data accessed from one or more databases (e.g., construction databases) without the individual and the CSR previously discussing the location of the valve during the current communication. Additionally or alternatively, to generate the first step to shut off the valve, the computing system 12 may rely on information about the location of the valve that was derived from the images obtained by the camera 32 during the current communication without the individual and the CSR previously discussing the location of the valve during the current communication. In this way, the computing system 12 may make the process more efficient and more streamlined, which may provide numerous advantages, such as limiting a time that the CSR is engaged to address the damage and/or limiting an extent of the damage to the property.

In some embodiments, the computing system 12 may output the steps of the mitigation protocol to the smart glasses 26 for display to the individual. The computing system 12 may output the same or different text to the computer 44 for display to the CSR and to the smart glasses 26 for display to the individual. For example, the text provided to the computer 44 may include more words to more fully explain how to complete the step, while the text provided to the smart glasses 26 may include fewer words (or no words and only symbols) to fit on the display 38 in a way that does not block too much of the individual's view of a real-world environment through the display 38.

The smart glasses system 10 may be configured to carry out other techniques. For example, the computing system 12 may overlay text (e.g., words, letters, numbers, symbols) onto the images and may output the modified images with the overlay to the computer 44 for display to the CSR and/or to the smart glasses 26 for display to the individual. For example, the displayed image 54 may include an arrow overlaid onto the image of the room at the property, with the arrow pointed at a target area (e.g., the cabinet that should be opened to access the valve). In some cases, the smart glasses 26 may temporarily display the modified images in a manner that blocks some or an entirety of the individual's view of the real-world environment through the display 38. However, the modified images may mimic what the individual would see through the display 38 if the modified images were not present, and may also include helpful additions, such as an arrow that points to the target area to assist the individual in carrying out the mitigation protocol. This may be accomplished in other ways without blocking the individual's view of the real-world environment, such as by instructing the individual to look in a certain direction and/or then instructing the smart glasses 26 to place the arrow at a particular location on the display 38 such that the arrow appears to the individual to point to the target area.

In addition to assisting the individual and the CSR to take steps to mitigate the damage to the property, the computing system 12 may analyze the inputs to assess the damage to the property and to calculate a cost to repair the damage. In particular, the computing system 12 may analyze the inputs to determine a type of the damage, a severity of the damage, a source of the damage, and/or a location of the damage. Then, the computing system 12 may reference prior data (e.g., historical or modeled data) and/or utilize machine learning algorithms to calculate the cost to repair the damage. The prior data may include prior costs to repair the same or similar damage (e.g., same or similar type, severity, source, and/or location). For example, upon identifying a burst fluid hose for a make and model dishwasher that is located in a first home in a first city, the computing system 12 may reference prior costs to repair a burst fluid hose for the make and model dishwasher within other homes in the first city.

The computing system 12 may also utilize the prior data to make a recommendation with respect to the repair of the damage to the property. For example, the prior data may indicate that the cost to repair the dishwasher exceeds a replacement cost to replace the dishwasher with a more reliable dishwasher, and the computing system 12 may determine that it is recommended that the individual replace the dishwasher. In any case, the computing system 12 may output the recommendation to the computer 44 for display to the CSR and/or to the smart glasses 26 for display to the individual.

In some embodiments, the computing system 12 may be configured to include a recommendation for one or more particular replacement appliances based on dimensions of the existing appliance, dimensions of a space for the appliance, and/or a brand and/or a cost of the existing appliance. For example, the computing system 12 may determine the dimensions based on the images and/or based on the make, model, and year of the existing appliance. The computing system 12 may also recommend the same brand, particularly if the existing appliance lasted more than a threshold time (e.g., five years) and/or did not have any repairs during the time of ownership. The computing system 12 may also recommend the replacement appliance(s) to be within a range of the cost of the existing appliance, as this may indicate the individual's general preferences related to cost and budget. In some cases, the computing system 12 may recommend multiple replacement appliances across different brands and/or different price points for selection by the individual.

The computing system 12 may recommend the replacement appliances based on the prior data collected over time, as the prior data may indicate which makes, models, and years of the appliances have early failures, high-cost failures or secondary damage to nearby structures, or the like. In this way, the computing system 12 may learn and refine its recommendations over time. Advantageously, the computing system 12 may allow the individual to view a representation of one of the replacement appliances in an appropriate space (e.g., overlay an existing appliance as part of the modified image and/or displayed to be aligned with the real-world environment) and/or to order the replacement appliance by providing a verbal input to confirm the order. In some cases, the CSR may be presented with the replacement appliances, and the CSR may provide a verbal or a keyed input to confirm the order based on their discussion with the individual. Similarly, the computing system 12 may recommend preventative inspection and/or maintenance based on the prior data, such as to recommend that the individual inspect the dishwasher in their home and/or replace a water hose for the dishwasher after 30 months of operation because the prior data indicates failure of the water hose for the dishwasher is likely after 36 months of operation.

As noted herein, the smart glasses system 10 may be integrated with and/or coordinated with an insurance system. Thus, the computing system 12 (or some other computing system) may adjust an insurance cost (e.g., premium and/or deductible) for an insurance policy associated with the individual and/or the property based on activation of the smart glasses system and/or features of the smart glasses system 10 as it is implemented at the property. For example, a discount may be applied to the insurance cost for a property insurance policy for the property in response to the individual registering the smart glasses 26 with the computing system 12 (e.g., associating the smart glasses with the property), setting up the smart glasses 26 to link to the computing system 12 (e.g., by downloading an application on the smart glasses), inputting information about the property that would facilitate assessment of the damage to the property via the smart glasses system 10 (e.g., a make, model, and year of an appliance; a floorplan) during a registration process, and/or using the smart glasses system 10 to address damage at the property.

As another example, a discount may be applied to the insurance cost for the property insurance policy for the property in response to the individual proceeding with a recommended repair and/or replacement. Indeed, the smart glasses system 10 may output various recommendations, including recommendations to carry out preventive inspections, preventive maintenance, repairs, and/or replacements, and then the discount may be applied to the insurance cost for the property insurance policy for the property in response to completion of tasks noted in the recommendations. As noted above, the computing system 12 may recommend that the individual conduct an inspection of a water hose of a dishwasher in their home, and the computing system 12 may then provide the discount in response to the individual completing a communication with the CSR via the smart glasses 26 and/or providing images from the camera 32 of the smart glasses 26 for assessment by the CSR and/or the computing system 12.

With reference to FIG. 1, the computing system 12 may include any suitable computer device, such as a general-purpose personal computer, a laptop computer, a tablet computer, a mobile computer, or the like that is configured in accordance with present embodiments. The communication component 14 may facilitate wired or wireless communication between the computing system 12, the smart glasses 26, the computer 44, multiple other smart glasses for other individuals, multiple other computers for other CSRs, data sources, and various other computing systems via the network 30. The processor 16 may be any type of computer processor or microprocessor capable of executing computer-executable code. The processor 16 may also include multiple processors that may perform the various operations described herein.

The memory device 18 and the storage device 20 may be any suitable articles of manufacture that can serve as media to store processor-executable code, data, or the like. These articles of manufacture may represent computer-readable media (e.g., any suitable form of memory or storage) that may store the processor-executable code used by the processor 16 to perform various techniques disclosed herein. The memory device 18 and the storage device 20 may represent non-transitory computer-readable media (e.g., any suitable form of memory or storage). It should be noted that non-transitory merely indicates that the media is tangible and not a signal.

The I/O ports 22 may be interfaces that may couple to other peripheral components, such as input devices (e.g., keyboard, mouse). The display 24 may operate as a human machine interface (HMI) to depict visualizations associated with software or executable code being processed by the processor 16. In one embodiment, the display 24 may be a touch display capable of receiving inputs from a user of the computing system 12. The display 24 may be any suitable type of display, such as a liquid crystal display (LCD), plasma display, or an organic light emitting diode (OLED) display, for example. It should be noted that the components described above with regard to the computing system 12 are examples and the computing system 12 may include additional or fewer components. Similarly, the smart glasses 26 and the computer 44 may also each include a processor, a memory device, a storage device, I/O ports, and a communication component having the same or similar features.

It should be appreciated that the smart glasses 26 may include, may be replaced by, and/or may be used in conjunction with an advanced lens (or lenses), such as a permanent lens or an intraocular bionic lens that is surgically placed in an eye of an individual or a removable lens or a contact lens that is temporarily worn on the eye of the individual. While the smart glasses 26 support certain components on the frame 42 that mounts to the head of the individual, the advanced lens may support certain components (e.g., camera and display) on a rigid or flexible body that contacts the eye of the individual. Additionally or alternatively, the smart glasses 26 may be replaced by and/or may be used in conjunction with a mobile phone, tablet, or other personal device carried by the individual. For example, the individual may use a camera of the mobile phone to capture images of the damage at the property, and a display of the mobile phone may display the steps of the mitigation protocol. As another example, the individual may use the camera 32 of the smart glasses to capture images of the damage at the property, the display 38 of the smart glasses 26 to view the steps of the mitigation protocol, and the mobile phone or some other mobile device to carry out the spoken conversation with the CSR.

As used herein, machine learning refers to algorithms and statistical models that may be used to perform a specific task without using explicit instructions, relying instead on patterns and inference. In particular, machine learning generates a mathematical model based on data (e.g., sample or training data, previous damage data) in order to make predictions or decisions without being explicitly programmed to perform the task. Thus, as images, sounds, and/or other inputs are collected, and patterns may be identified and processed via machine learning to determine the characteristics of the damage (e.g., the type of the damage, the source of the damage), to generate the mitigation protocol, and to estimate the cost to repair the damage.

Figure 2:
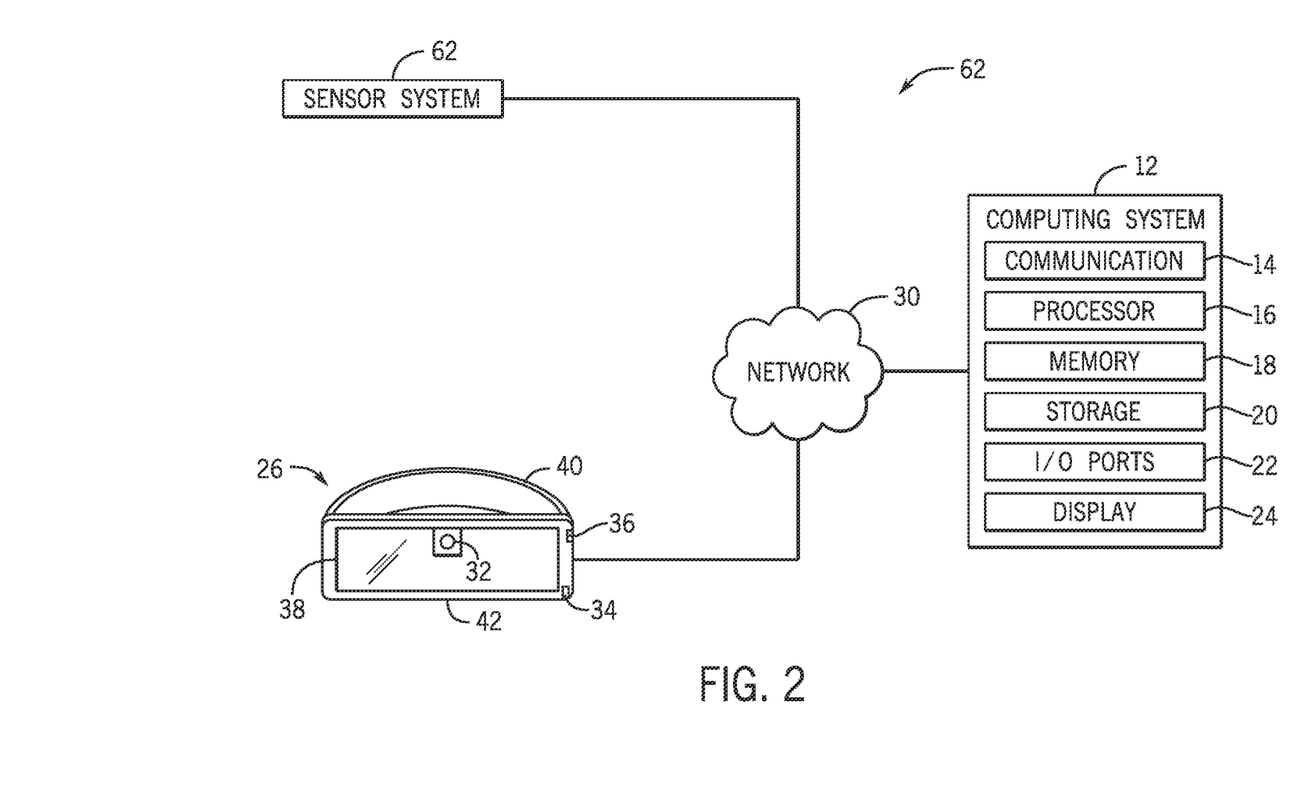
FIG. 2 illustrates a schematic diagram of a smart glasses system that includes or coordinates with a sensor system, in accordance with embodiments described herein.

FIG. 2 illustrates a schematic diagram of a smart glasses system 60 that includes or coordinates with a sensor system 62, in accordance with embodiments described herein. The smart glasses system 60 includes a computing system and smart glasses, which for purposes of discussion and simplicity in the figures are represented as the computing system 12 and the smart glasses 26. The computing system 12 is shown as having the communication component 14, the processor 16, the memory device 18, the storage device 20, the I/O ports 22, and the display 24. The smart glasses 26 are shown as having the camera 32, the microphone 34, the speaker 36, the display 38, the strap 40, and the frame 42. The computing system 12 may utilize the communication component 14 to communicate with the smart glasses 26 and/or the sensor system 62 via the network 30.

The sensor system 62 may include any of a variety of sensors, such as one or more leak sensors that are configured to detect leaks (e.g., at hoses or pipes), one or more fluid sensors that are configured to detect a presence of fluid (e.g., pools of water), one or more fluid fingerprinting sensors that are configured to detect characteristics of fluid, one or more sound sensors that are configured to detect sounds, and/or one or more cameras that are configured to capture images. The sensor system 62 may have its own hub or central controller, which may communicate with each of the sensors and collect sensor data from each of the sensors. Then, the hub may transmit the sensor data to the computing system 12. However, in some embodiments, the sensors may communicate their respective sensor data directly to the computing system 12 or via any other paths of communication.

Certain types of sensor data may trigger an alert to the individual. For example, if the leak sensor detects a leak, the sensor system 62 and/or the computing system 12 may trigger the alert to the individual. For example, the hub of the sensor system 62 may provide an audible alarm and/or a visible alarm (e.g., illumination of light emitters; text message). Additionally or alternatively, the computing system 12 may instruct output of an audible alarm via the speaker 36 of the smart glasses 26 and/or a visible alarm (e.g., text message) on the display 38 of the smart glasses 26. For example, the visible alarm may instruct the individual to use the smart glasses 26 to address the leak and to mitigate damage.

In some cases, the sensor data may indicate a source of the leak. For example, the fluid fingerprinting sensors may indicate that the source of the leak is the dishwasher based on a chemical composition of the fluid. In such cases, the visible alarm may instruct the individual to move to the dishwasher to address the leak and the to mitigate the damage. Then, as the individual approaches and/or is positioned near the dishwasher with the smart glasses 26 on their head, the camera 32 may capture images of the dishwasher. The images may be transmitted to the computing system 12, which may analyze the images as set forth herein. The computing system 12 may output information via the speaker 36 and/or the display 38 to guide the individual to move to collect images from particular locations (e.g., open the dishwasher door to capture images of the make and model, capture a front view to facilitate measurement of dimensions). The computing system 12 may also prompt the individual to provide verbal inputs via the microphone 34 and/or the computing system 12 may access relevant property data.

Then, the computing system 12 may generate a mitigation protocol and may provide the mitigation protocol to the smart glasses 26 for presentation to the individual (e.g., via the speaker 36 and/or the display 38). For example, as set forth herein, the computing system 12 may instruct the individual to shut off a valve in a cabinet via audible instructions delivered by the speaker 36 and/or via visible instructions (e.g., text message and/or overlay) on the display 38. In this way, the computing system 12 may be configured to carry out an automated exchange with the individual via the smart glasses 26 without involving or connecting to the workstation of the CSR. Furthermore, the computing system 12 may monitor whether each mitigation step is successful and may guide the individual to carry out multiple mitigation steps in sequence. The computing system 12 may rely on the images from the camera 32, the verbal input and/or sound input from the microphone 34, and/or any of the sensor data from the sensor system 62 to assess whether each mitigation step is successful and to determine whether to progress to the next mitigation step (and to update the next mitigation step, as appropriate).

In some embodiments, the computing system 12 may assist the individual in this automated manner for only a portion of the mitigation protocol. For example, the computing system 12 may guide the individual through a first step to shut off the valve; however, if the individual is unable to shut off the valve or if this step is not successful, then the computing system 12 may determine that the current communication should be escalated to a CSR at that point. Then, the computing system 12 may facilitate the connection between the smart glasses 26 and the workstation of the CSR, and the remainder of the mitigation protocol may be carried out with assistance from the CSR, as discussed above with respect to FIG. 1. In some cases, the computing system 12 may connect the smart glasses 26 to the workstation of the CSR for other reasons and/or as part of a standard procedure. Indeed, the computing system 12 may connect the smart glasses 26 to the workstation of the CSR prior to ending every communication so that the CSR can check and confirm that the steps in the mitigation protocol have been completed properly. It should be appreciated that features of the embodiments shown and described with reference to FIGS. 1 and 2 may be combined in any suitable manner. For example, the smart glasses system 60 may also provide a cost to repair the damage and/or adjust insurance costs. As another example, the sensor system 62 may be utilized in the smart glasses system 10 of FIG. 1.

Figure 3:
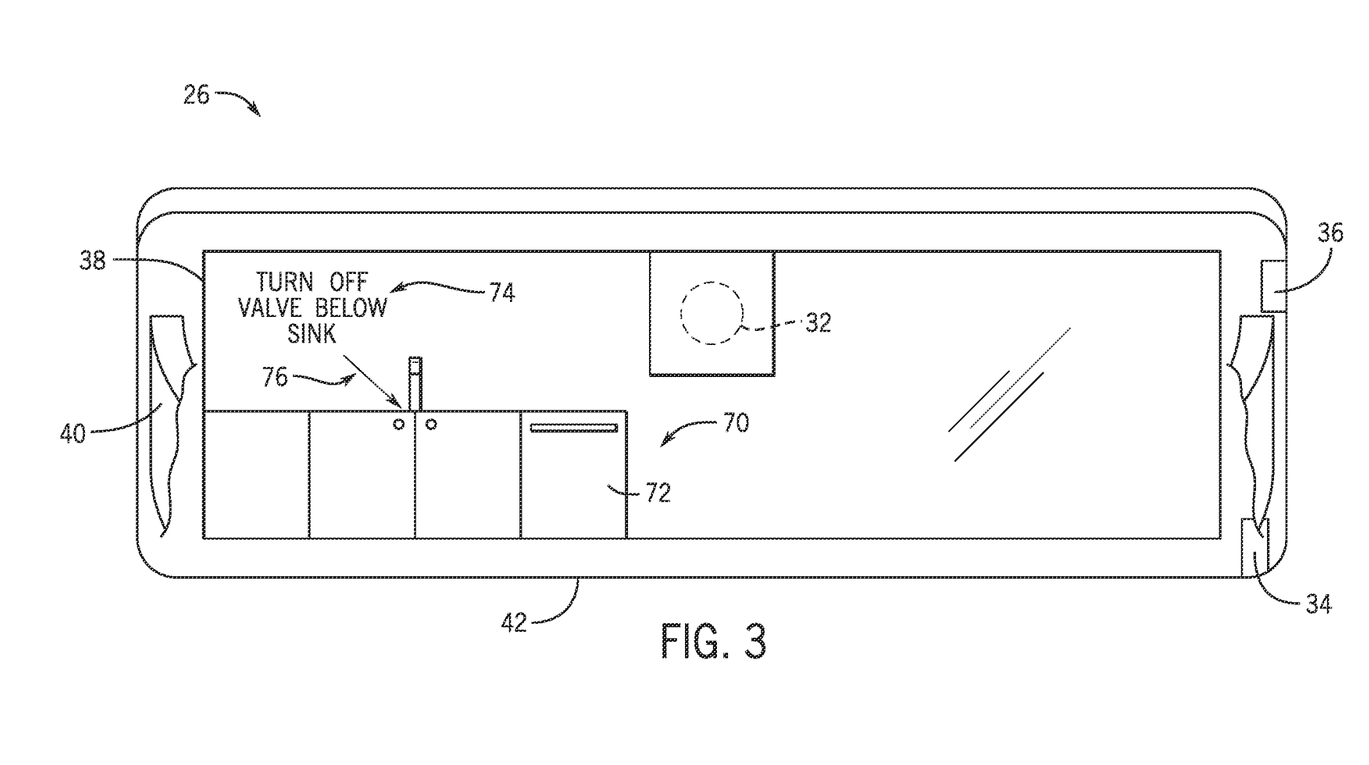
FIG. 3 illustrates a rear view of a display that may be incorporated into smart glasses of the smart glasses systems of FIGS. 1 and 2, wherein the display provides information related to a mitigation protocol, in accordance with embodiments described herein.

FIG. 3 illustrates a rear view of the display 38 that may be incorporated into the smart glasses 26 of the smart glasses systems 10, 60 of FIGS. 1 and 2, wherein the display 38 provides information related to a mitigation protocol, in accordance with embodiments described herein. As shown, the display 38 may be transparent (or at least include a transparent portion) to enable the individual to view a real-world environment 70 (e.g., the property, such as an existing dishwasher 72) through the display 38.

The display 38 may present information (e.g., text, images) to the individual wearing the smart glasses 26. In particular, the display 38 may present information to enable the individual to view the information overlaid onto the real-world environment 70. In this way, the smart glasses systems 10, 60 may provide an augmented reality (AR) experience to facilitate efficient and thorough damage assessment. For example, a text message 74 that describes a step of a mitigation protocol (e.g., "TURN OFF VALVE BELOW SINK") may be presented via the display 38, and an arrow symbol 76 (e.g., that appears to point at the sink from a viewpoint of the individual) may be presented via the display 38 to guide the individual through the mitigation protocol. The computing system 12 and/or processing components on the smart glasses 26 may position the text message 74 so as not to block the view of the relevant portions of the real-world environment 70 and/or so as to align the arrow symbol 76 with the real-world environment 70. Thus, as the individual moves about the property, the text message 74 and/or the arrow symbol 76 update and move relative to the display 38 to provide an accurate indication to the individual. Alternatively, as noted herein, the text message 74 and/or the arrow symbol 76 may be overlaid onto an image captured by the camera 32, and then the modified image may be presented on the display 38. It should be appreciated that FIG. 3 is merely one non-limiting example of the information that may be presented via the display 38 of the smart glasses 26.

Figure 4:
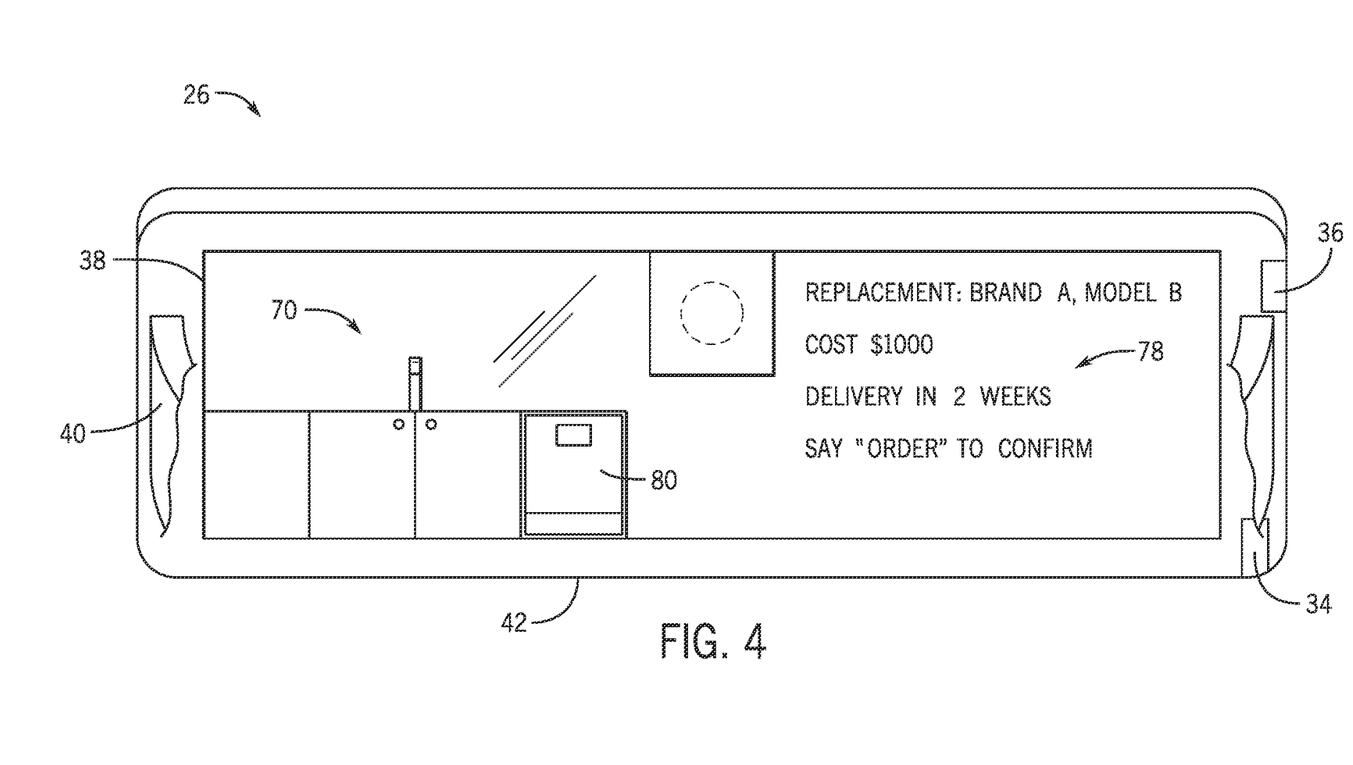
FIG. 4 illustrates a rear view of a display that may be incorporated into smart glasses of the smart glasses systems of FIGS. 1 and 2, wherein the display provides information related to a replacement appliance, in accordance with embodiments described herein.

FIG. 4 illustrates a rear view of the display 38 that may be incorporated into the smart glasses 26 of the smart glasses systems 10, 60 of FIGS. 1 and 2, wherein the display 38 provides information related to a replacement appliance, in accordance with embodiments described herein. As shown, the display 38 may be transparent (or at least include a transparent portion) to enable the individual to view the real-world environment 70 (e.g., the property, such as a cabinet that houses a dishwasher) through the display 38.

The display 38 may present information (e.g., text, images) to the individual wearing the smart glasses 26. In particular, the display 38 may present information to enable the individual to view the information overlaid onto the real-world environment 70. In this way, the smart glasses systems 10, 60 may provide an augmented reality (AR) experience to facilitate efficient and thorough damage assessments. For example, a text message 78 that describes a recommendation to replace an existing dishwasher may be presented via the display 38. The text message 78 may also include instructions as to how the individual can complete an order for the dishwasher, such as by provide the verbal input "CONFIRM" via the microphone 34 of the smart glasses 26. As shown, an image 80 of a replacement dishwasher may be overlaid onto the real-world environment 70 (e.g., overlaid on the existing dishwasher) to enable the individual to visualize the replacement dishwasher at the property.

The computing system 12 and/or processing components on the smart glasses 26 may position the text message 78 so as not to block the view of the relevant portions of the real-world environment 70 and/or so as to align the image 80 with the real-world environment 70. Thus, as the individual moves about the property, the text message 78 and/or the image 80 update and move relative to the display 38 to provide an accurate indication to the individual. Alternatively, as noted herein, the text message 78 and/or the image 80 may be overlaid onto an image captured by the camera 32, and then the modified image may be presented on the display 38. It should be appreciated that FIG. 4 is merely one non-limiting example of the information that may be presented via the display 38 of the smart glasses 26.

Figure 5:
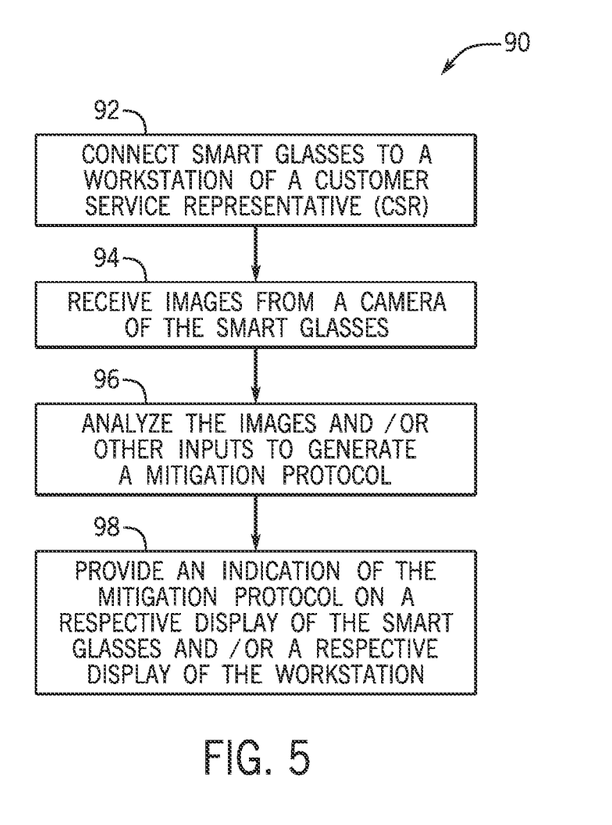
FIG. 5 is a flow diagram that illustrates a method for operating the smart glasses systems of FIGS. 1 and 2, in accordance with embodiments described herein.

FIG. 5 is a flow chart that illustrates steps of a method 90 for operating the smart glasses systems 10, 60 of FIGS. 1 and 2, in accordance with embodiments described herein. Although the following description of the method 90 is described in a particular order, which represents a particular embodiment, it should be noted that the method 90 may be performed in any suitable order. Furthermore, certain steps may be omitted and other steps may be added. Moreover, although the following description of the method 90 is described as being performed by the computing system 12, it should be noted that some or all of the steps of the method 90 may be performed by any suitable computing device.

In step 92, the computing system 12 may connect the smart glasses 26 to the workstation 28 of the CSR. The computing system 12 may connect the smart glasses 26 to the workstation 28 of the CSR in response to the smart glasses 26 being turned on and/or in response to a request received at the smart glasses 26. For example, the individual wearing the smart glasses 26 may provide a verbal input to request to speak with the CSR. The individual and the CSR may carry on a spoken conversation, which may allow the CSR to provide support and guidance to the individual to address damage at a property.

In step 94, the computing system 12 may receive images from the camera 32 of the smart glasses 26. The computing system 12 may also receive other inputs, such as sound inputs from the microphone 34 of the smart glasses 26 and/or other sound sensors at the property; verbal inputs from the microphone 34 of the smart glasses 26, other sound sensors at the property, and/or the microphone 50 of the workstation 28; keyed inputs from the input device 48 of the workstation 28; and/or prior data, such as a floorplan for the property, historical and/or modeled data for other properties, appliance information for appliances at the property, or the like.

In step 96, the computing system 12 may analyze the images and/or the other inputs to generate a mitigation protocol to address the damage at the property. As set forth herein, the computing system 12 may take various factors into account, such as characteristics of the damage and/or prior data to generate the mitigation protocol. Furthermore, the computing system 12 may update the mitigation protocol during the current communication with the individual. In step 98, the computing system 12 may provide an indication of the mitigation protocol on the display 46 of the workstation 28 and/or the display 38 of the smart glasses 26 to facilitate completion of the mitigation protocol. The mitigation protocol may include one or more steps for the individual to complete and/or recommendations related to repair and/or replacement of parts.

As noted herein, the computing system 12 may carry out steps to generate the mitigation protocol and to provide the indication of the mitigation protocol to the individual via the smart glasses 26 without involving the CSR, at least for some portion of the current communication with the individual. Furthermore, the sensor system 62 may be utilized to provide alerts to initiate the assessment; the computing system 12 may determine recommendations for repair, replacement, and/or preventive strategies; and/or the computing system 12 may initiate adjustments to insurance costs based on certain actions related to implementation of the smart glasses systems 10, 60. Accordingly, the method 90 is merely exemplary and various other features disclosed herein may be incorporated into the method 90 and/or applied to modify the method 90.

Advantageously, the disclosed techniques may enable more efficient and accurate inspection, mitigation, and repair of damage to a property. While certain examples relate to leaks, flooding, and/or failed appliances, it should be appreciated that the present techniques may be adapted for use to assess and/or to mitigate any of a variety of types of damage (e.g., fire damage, theft) to any of a variety of types of property (e.g., vehicles, fine art, commercial buildings).

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A smart glasses system, comprising:
a sensor configured to detect a leak at a property; and
smart glasses configured to be worn by an individual, wherein the smart glasses comprise:
a display; and
a camera configured to obtain one or more images; and
one or more processors communicatively coupled to the sensor and the smart glasses and configured to:
receive sensor data indicative of the leak at the property from the sensor;
in response to receipt of the sensor data, generate an audible alert via a speaker of the smart glasses and a visible alert via the display, wherein the visible alert comprises a text message that instructs the individual to wear the smart glasses to address the leak at the property;
receive the one or more images;
process, via executing image analysis, the one or more images to identify characteristics of damage to the property;
generate, based on the characteristics of the damage to the property, a mitigation protocol; and
provide an output indicative of one or more steps of the mitigation protocol and one or more modified images to the smart glasses for presentation to the individual via the display, wherein the one or more modified images comprise the one or more images overlaid with text.

2. The smart glasses system of claim 1, wherein the smart glasses are configured to be worn on a head of the individual with the display positioned in front of eyes of the individual.

3. The smart glasses system of claim 1, wherein the one or more processors are configured to access property data for the property and to generate the mitigation protocol based on the property data.

4. The smart glasses system of claim 3, wherein the property data comprises a floorplan of the property.

5. The smart glasses system of claim 3, wherein the property data comprises a model of an appliance at the property.

6. The smart glasses system of claim 1, wherein the smart glasses comprise a microphone configured to detect a verbal input from the individual, and the one or more processors are configured to:
receive the verbal input; and
process the verbal input to identify the characteristics of the damage to the property.

7. The smart glasses system of claim 1, wherein the smart glasses comprise a microphone configured to detect sounds, and the one or more processors are configured to:
receive data indicative of the sounds from the microphone; and
process the data to identify the characteristics of the damage to the property.

8. The smart glasses system of claim 1, wherein the one or more processors are configured to:
access prior data related to prior damage to other properties; and
calculate a cost to repair the damage based on the characteristics of the damage and the prior data.

9. The smart glasses system of claim 1, wherein the one or more steps of the mitigation protocol comprise replacement of an appliance at the property, and the one or more processors are configured to identify a recommended appliance and to provide an appliance image of the recommended appliance to the smart glasses for presentation to the individual via the display.

10. The smart glasses system of claim 1, comprising a workstation for a customer service representative, wherein the workstation comprises a workstation display and the one or more processors are configured to provide the one or more images to the workstation for presentation to the customer service representative via the workstation display.

11. The smart glasses system of claim 10, wherein the one or more processors are configured to provide the output indicative of the one or more steps of the mitigation protocol to the workstation for presentation to the customer service representative via the workstation display.

12. The smart glasses system of claim 3, wherein the one or more processors are configured to:
receive an identifier from the smart glasses;
access the property data based on the identifier.

13. The smart glasses system of claim 1, wherein the one or more processors are configured to process, via executing image analysis, the one or more images to determine one or more dimensions of an existing appliance at the property, a space available for a replacement appliance at the property, or both.

14. The smart glasses system of claim 13, wherein the one or more processors are configured to:
identify one or more replacement appliances based on the one or more dimensions of the existing appliance at the property, the space for the replacement appliance at the property, or both; and
provide a recommendation of the one or more replacement appliances for presentation to the individual via the display.

15. The smart glasses system of claim 14, wherein the one or more modified images provided to the smart glasses comprise the recommendation as a representation of a particular replacement appliance of the one or more particular replacement appliances to enable the individual to view the representation of the particular replacement appliance in the space available for the replacement appliance at the property via the display.

16. A method of operating a smart glasses system, the method comprising:

receiving, at one or more processors and from a sensor, sensor data indicative of a leak at a property;

generating, using the one or more processors, an audible alert via a speaker of smart glasses and a visible alert via a display of the smart glasses in response to receipt of the sensor data, wherein the visible alert comprises a text message that instructs an individual to wear the smart glasses to address the leak at the property;

receiving, at the one or more processors, one or more images captured by a camera of the smart glasses located at the property;

receiving, at the one or more processors, additional inputs related to damage at the property;

processing, using the one or more processors, the one or more images, the additional inputs, or both to identify characteristics of damage to the property and to generate a mitigation protocol to address the damage to the property, wherein processing the one or more images includes executing image analysis of the one or more images captured by the camera; and outputting, using the one or more processors, an indication of one or more steps of the mitigation protocol to the smart glasses and one or more modified images for presentation to the individual via the display of the smart glasses, wherein the one or more modified images comprise the one or more images overlaid with text.

17. The method of claim 16, wherein outputting the indication of the one or more steps of the mitigation protocol comprises outputting an image of a replacement part aligned with and overlaid onto a real-world environment.

18. The method of claim 16, comprising outputting, using the one or more processors, the indication of the one or more steps of the mitigation protocol to a workstation display located remotely from the property for visualization by a customer service representative.

19. A smart glasses system, comprising:

smart glasses configured to be worn by an individual, wherein the smart glasses comprise:
 a display; and
 a camera configured to obtain one or more images; and one or more processors communicatively coupled to the smart glasses and configured to:
 receive the one or more images;
 process, via executing image analysis, the one or more images to identify characteristics of damage to a property;
 generate, based on the characteristics of the damage to the property, a mitigation protocol;
 process, via executing image analysis, the one or more images to determine one or more dimensions of an existing appliance at the property, a space available for a replacement appliance at the property, or both;
 identify one or more replacement appliances based on the one or more dimensions of the existing appliance at the property, the space for the replacement appliance at the property, or both; and
 provide an output indicative of one or more steps of the mitigation protocol, a recommendation of the one or more replacement appliances, and one or more modified images to the smart glasses for presentation to the individual via the display, wherein the one or more modified images comprise the one or more images overlaid with text and the recommendation as a representation of a particular replacement appliance of the one or more particular replacement appliances to enable the individual to view the representation of the particular replacement appliance in the space available for the replacement appliance at the property via the display.

* * * * *